United States Patent
Clark et al.

(10) Patent No.: US 7,679,529 B2
(45) Date of Patent: Mar. 16, 2010

(54) METHOD AND APPARATUS FOR INDICATING OPERATIONAL STATE OF AIRCRAFT ENGINE

(75) Inventors: Samuel T. Clark, Federal Way, WA (US); Andrew W. Houck, Woodinville, WA (US); Joseph A. Sikora, Seattle, WA (US); Roglenda R. Bowe, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 521 days.

(21) Appl. No.: 11/635,418

(22) Filed: Dec. 7, 2006

(65) Prior Publication Data

US 2008/0136677 A1 Jun. 12, 2008

(51) Int. Cl.
*G01C 23/00* (2006.01)

(52) U.S. Cl. .................. 340/973; 340/945; 340/946; 340/963; 340/978; 340/441; 701/14; 701/110

(58) Field of Classification Search ............... 340/945, 340/959, 963, 971, 973, 978, 441, 946; 701/14, 701/110

See application file for complete search history.

(56) References Cited

U.S. PATENT DOCUMENTS

| | | | | |
|---|---|---|---|---|
| 3,512,128 | A * | 5/1970 | Maki | 340/963 |
| 4,044,709 | A * | 8/1977 | Green | 116/280 |
| 4,060,979 | A * | 12/1977 | Elsaesser et al. | 60/773 |
| 4,325,123 | A * | 4/1982 | Graham et al. | 701/110 |
| 4,750,127 | A * | 6/1988 | Leslie et al. | 701/16 |
| 5,050,081 | A | 9/1991 | Abbott | |
| 5,353,022 | A * | 10/1994 | Middleton et al. | 340/959 |
| 5,404,766 | A | 4/1995 | Thomas | |
| 5,422,625 | A * | 6/1995 | Sakaemura | 340/461 |
| 5,668,542 | A | 9/1997 | Wright | |
| 6,085,129 | A * | 7/2000 | Schardt et al. | 701/14 |
| 6,112,141 | A * | 8/2000 | Briffe et al. | 701/14 |
| 6,118,385 | A | 9/2000 | Leard | |
| 6,188,937 | B1 * | 2/2001 | Sherry et al. | 701/14 |
| 6,505,594 | B1 * | 1/2003 | Katayama et al. | 123/179.18 |
| 6,735,505 | B2 * | 5/2004 | Levine | 701/35 |
| 7,053,796 | B1 | 5/2006 | Barber | |
| 7,055,473 | B2 * | 6/2006 | Katayama | 123/90.15 |
| 7,088,264 | B2 * | 8/2006 | Riley | 340/963 |
| 7,143,003 | B2 * | 11/2006 | Certain | 702/144 |
| 7,149,646 | B2 * | 12/2006 | Certain | 702/144 |
| 7,414,544 | B2 * | 8/2008 | Oltheten et al. | 340/946 |
| 2004/0004557 | A1 | 1/2004 | Sikora | |

FOREIGN PATENT DOCUMENTS

DE 3315386 10/1984
EP 1378446 1/2004

* cited by examiner

*Primary Examiner*—Davetta W Goins
*Assistant Examiner*—Anne V Lai
(74) *Attorney, Agent, or Firm*—Ostrager Chong Flaherty & Broitman P.C.

(57) ABSTRACT

A method and a system for indicating a target idle running speed, a predicted core speed, a predicted time to running, current engine state or automation modes of an operating aircraft engine, and indicating that the current core speed of the aircraft engine is less than a target idle running speed or is abnormally decreasing towards a target idle running speed. The indicators may be visual or aural. The visual indicators may include graphical or numeric symbols indicating the target idle running speed, the direction of core speed change, the predicted core speed at some future time, or current engine state or automation mode.

27 Claims, 4 Drawing Sheets

METHOD AND APPARATUS FOR INDICATING OPERATIONAL STATE OF AIRCRAFT ENGINE

TECHNICAL FIELD

The present disclosure relates generally to methods and systems for indicating aircraft engine characteristics, such as the operational state of the engines, to the flight crew of the airplane.

BACKGROUND

Modern aircraft engine flight deck displays typically include computer-driven display screens dedicated to presenting engine status information. These display screens typically present to the pilots engine data indicating the values of a variety of engine operating parameters. For example, the display screens can present a primary engine display (shown in FIG. 1) and a secondary engine display (shown in FIG. 2).

The primary engine display can present top-level engine parameter data, such as exhaust pressure ratio (EPR) display 30, fan speed (N1) display 32, and exhaust gas temperature (EGT) display 34. The primary engine display can include multiple sets of displays (two are shown in FIG. 1), one set for each engine of the aircraft.

The secondary engine display can include information corresponding to other engine operating parameters. For example, the secondary engine display shown in FIG. 2 can include turbine shaft rotation speed (N2) display 36, fuel flow display 38, oil pressure display 40, oil temperature display 42, oil quantity display 44, and engine vibration display 46.

One characteristic associated with the foregoing approaches for displaying engine data is that the pilot or other crew member operating the aircraft must be able to quickly and easily monitor/view the data, integrate and interpret the data, and determine whether the data warrant crew awareness or action. If action is required, in many cases, the pilot must determine what action is most appropriate for the circumstances.

The primary crew tasks are to aviate, navigate, and communicate. Airplane system-related monitoring, detection and interpretation tasks should be minimized. The airplane system interface must be simple and salient. During engine start or recovery from a subidle condition, the crew must monitor, detect and interpret for engine start or recovery progress (e.g., recovering/not recovering), automation modes and submodes (e.g., automatic, semi-automatic, autostart, autorelight, accommodating for various non-normal conditions), and engine state (e.g., flameout, subidle, motoring, running). Currently, no explicit or easy means is provided to aid the crew in determining automation modes and submodes, if engine start/recovery is progressing normally, or how long start/recovery will likely take. The resulting crew monitoring, detection, and interpretation tasks introduce crew workload and error potential. The crew may inappropriately interrupt and delay, or terminate engine start. Conversely the crew may not, when necessary, intervene in a timely manner. Under some circumstances the pilot may need to monitor and interpret whether an engine start is progressing using whatever data/information is available.

Ways to provide new information within the context of the existing engine indication paradigm must be found and developed. The present invention provides new starting information to supplement the existing engine indication paradigm. During engine start or recovery from a subidle condition, the crew must currently monitor, detect, and interpret engine parameter indication changes to determine if engine start/recovery is progressing acceptably, estimate how long engine start/recovery will likely take, and determine when the engine is running. Monitoring and detection tasks increase crew workload and divert crew attention away from the primary task of flying and navigating the aircraft. Primary crew responsibilities, increasing levels and sophistication of engine automation designed to optimize engine start/recovery/operation, the broad range of possible operating conditions and circumstances, and the lack of explicit collocated engine automation and state indications, make correct/accurate crew interpretation of engine indications sometimes difficult.

Prior solutions involve crew monitoring, detection, interpretation, or integration tasks. In addition, no explicit engine parameter indication of target idle running speed or engine subidle/running state has been provided. The target idle running speed is the core engine speed below which the engine is considered subidle. The target idle running speed is the core engine speed at and above which the engine is considered running, can accept electrical and other loads, and can generate useful crew controllable thrust. This parameter value varies as a function of altitude, temperature and other factors such as engine make and model. Consequently, the crew must know, recall and typically estimate the engine parameter value at which the engine will be running, and/or divert time and effort to verify that the engine is running—often in a high workload or time critical situation.

There is a need for a system and a method for implementing explicit, reliable and meaningful engine start/recovery information/indications that support crew decision-making throughout the range of engine start/recovery regimes and possible engine malfunctions/abnormalities.

SUMMARY OF THE INVENTION

The present invention supports crew awareness and intervention/non-intervention response related decision making by providing information/indications that explicitly or implicitly help the crew readily, easily, and quickly determine at a glance engine start/recovery progress, the engine automation mode, and the operational state (e.g., subidle or running) of an aircraft engine. Optionally, information/indications can be provided that also help the crew readily, easily, and quickly determine at a glance how long engine start/recovery will likely take. The invention also has application in situations wherein the aircraft engine speed abnormally decreases toward a target idle running speed or for some other abnormal condition such as disagreement between commanded and indicated thrust.

One aspect of the invention is a method for communicating aircraft engine information to a pilot, comprising the steps of generating indicators that indicate the current core speed of an operating aircraft engine and a target idle running speed, wherein the indicators are visual or aural.

Another aspect of the invention is a method for communicating aircraft engine information to a pilot, comprising the following steps: (a) calculating the current core speed and speed rate of change of an operating aircraft engine; (b) generating a first indicator that indicates the calculated current core speed while the aircraft engine is operating; and (c) generating a second indicator at least whenever the operational state of the aircraft engine is a subidle condition, the second indicator indicating a target idle running speed of the aircraft engine, wherein the first and second indicators are visual or aural.

A further aspect of the invention is a system for indicating aircraft engine information onboard an aircraft, comprising: an indicator device that can be controlled electronically to generate indicators; and a processor programmed to control the indicator device to generate indicators indicating the current core speed of an operating aircraft engine and a target idle running speed in response to receipt of a signal indicating that a predetermined operating condition is present.

Yet another aspect of the invention is a system for indicating aircraft information onboard an aircraft, comprising: an indicator device that can be controlled electronically to generate indicators; and a processor programmed to control the indicator device to generate an indicator indicating whether the core speed of an operating aircraft engine is accelerating or decelerating whenever the operational state of the aircraft engine is a subidle condition or whenever the aircraft engine speed is abnormally decreasing towards a subidle condition.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

The present disclosure describes methods and systems for displaying aircraft engine characteristics. Many specific details of certain embodiments of the invention are set forth in the following description and in FIGS. 4-7 to provide a thorough understanding of these embodiments. One skilled in the art, however, will understand that the present invention may have additional embodiments, and that the invention may be practiced without several of the details described below.

Figure 2:
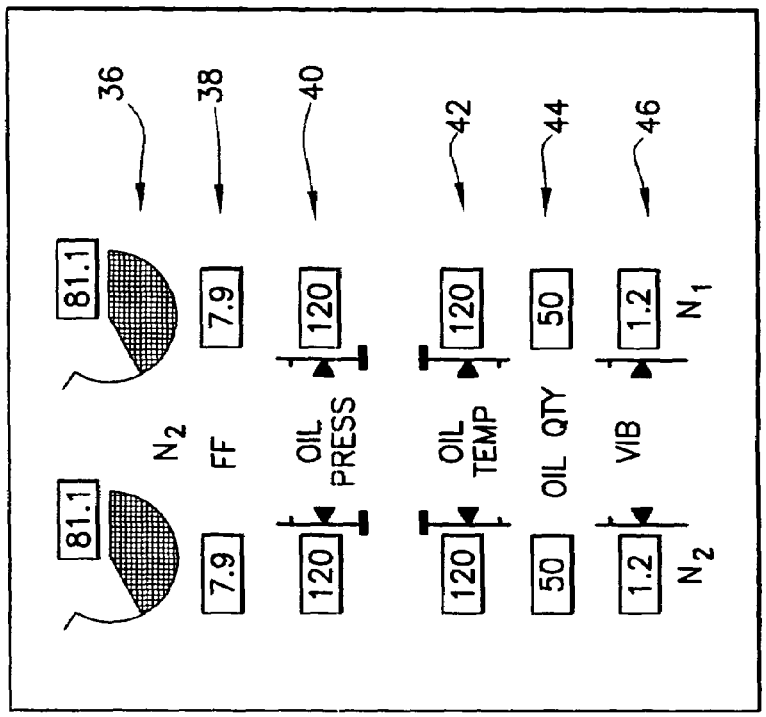
FIG. 2 is a drawing illustrating typical secondary engine indications for a known flight deck display.
Figure 1:
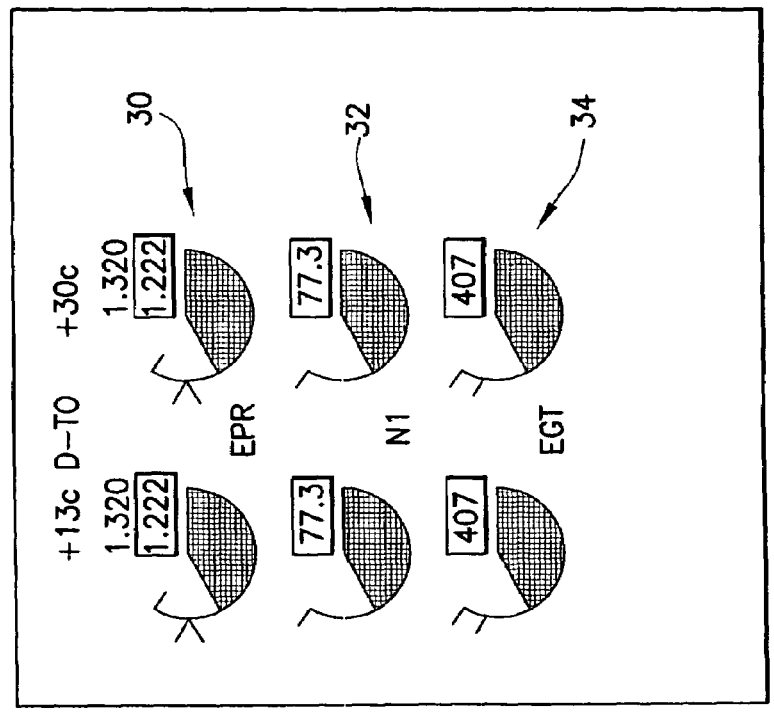
FIG. 1 is a drawing illustrating typical primary engine indications for a known flight deck display.
Figure 3:
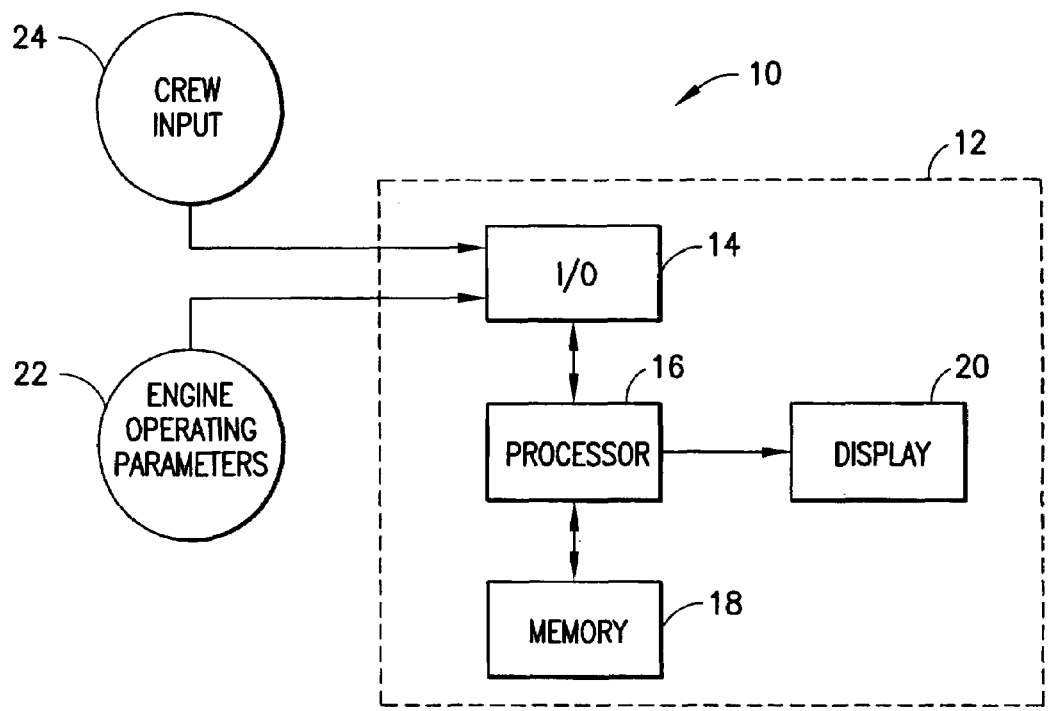
FIG. 3 is a block diagram illustrating a known system for displaying aircraft engine information/indications.

FIG. 3 is a schematic block diagram illustrating a system 10 that displays the state of one or more aircraft engines for viewing by the aircraft crew. The system 10 comprises a computer 12 having one or more input/output devices 14, a processor 16, a memory 18, and a display unit 20. In other embodiments, the functions carried out by the system 10 can be distributed over a plurality of computers or processing platforms. The input/output devices 14 can receive signals corresponding to engine automation and operating parameter signals 22, and, optionally, crew input signals 24, and environmental and aircraft system sensors and inputs 25. The processor 16 can determine the operational state of each engine, based at least in part on one or more of the engine automation or operating parameter signals 22. The processor 16 can then direct the display of an icon on the display unit 20 that qualitatively or quantitatively indicates the operational state of the engine (provides crew awareness). The processor 16 can optionally direct the display of an icon on the display unit 20 which explicitly or implicitly indicates to the pilot (a) whether an action is required and if so, (b) what the action should be.

In one embodiment, the computer 12 can be generally similar to existing avionics computers, but can be programmed and/or configured to carry out the foregoing processes. For example, the computer 12 can include an engine controller computer (EEC or FADEC) and/or an aircraft display computer. In any of these embodiments, one or more of the input/output devices 14 can be configured to receive the engine operating parameter signals 22 directly from the aircraft engines and/or from intermediate computers or processors. One or more of the input/output devices 14 can be configured to receive the crew input signals 24 and can accordingly include a keypad, mouse pad, touch screen, switches, control levers, or other such device. The crew input signals 24 can be used to tailor certain aspects of the manner in which information is presented on the display unit 20, or to obtain additional information, without affecting the content of the information. One or more of the input/output devices 14 can also be configured to access a computer-readable medium (such as a CD, diskette or USB memory device). Directions for carrying out processes in accordance with various embodiments of the present invention can be transferred from or stored on such media, and/or stored in the memory 18. The display unit 20 on which the information is presented can include a CRT screen, an LCD screen, or any other device that is configured to visually present engine-related information to the crew.

Typically the core speed, i.e., $N_2$ on General Electric (GE) and Pratt & Whitney (PW) engines, and $N_3$ on Rolls Royce (RR) engines, is a normalized value. The target idle running speed is the minimum core speed at which the operational state of the engine is not a subidle condition. The target idle running speed varies from engine to engine, and also varies as a function of the operating conditions for a particular engine/aircraft. More specifically, the value of the target idle running speed parameter varies as a function of altitude, pressure, temperature and other factors such as engine make and model.

In accordance with various embodiments of the present invention, the current core speed and the target idle running speed of an operating aircraft engine are calculated by a local processor (not shown in FIG. 3) and sent to the processor 16 via the input/output devices 14. Whenever the current core speed of the aircraft engine is less than its target idle running speed, the processor 16 causes the display unit 20 to display symbols indicating that condition. In other embodiments, engine automation and state information/indication may be displayed at times when the current core speed of the aircraft engine is at or above its target idle running speed.

In a conventional manner, while the aircraft engine is operating, the processor 16 controls the display unit 20 to display a first indicator representing the calculated current core speed. In the event that the operational mode of the aircraft engine is a subidle condition, the processor 16 also controls the display unit 20 to display a second indicator representing the target idle running speed of the aircraft engine. In the case where the indicators are graphical symbols, the first and second indicators are placed in a spatial relationship indicating that the current core speed of the aircraft engine is less than its target idle running speed. In the case where the indicators are numerical symbols, the numerical value of the first indicator indicating the current core speed of the aircraft engine will be less than the numerical value of the second indicator indicating the target idle running speed. Preferably, the first and the second indicators should be collocated and suitably differentiated—actual from target. Optionally, the second indicator is not displayed when the current core speed is greater than the target idle running speed except when certain abnormal conditions are present, such as the aircraft engine speed abnormally decreasing toward the target idle running speed or such as when there is disagreement between the commanded and indicated thrust.

In accordance with one embodiment of the invention, both graphical and alphanumeric engine start/recovery information is integrated with the display of core engine speed ($N_2$ on GE and PW engines, and $N_3$ on RR engines). Target idle running speed is displayed graphically on a round dial scale, and displayed numerically above the existing numeric core speed display. Optionally, a dynamic arrow with length based on core speed acceleration or deceleration displays predicted core speed in some period of time (e.g., 15 or 30 seconds). In addition, engine state and engine start/recovery automation mode information may be displayed. In other embodiments, graphical and alphanumeric engine start/recovery information may integrated with other engine parameters or implemented separately.

Figure 4:
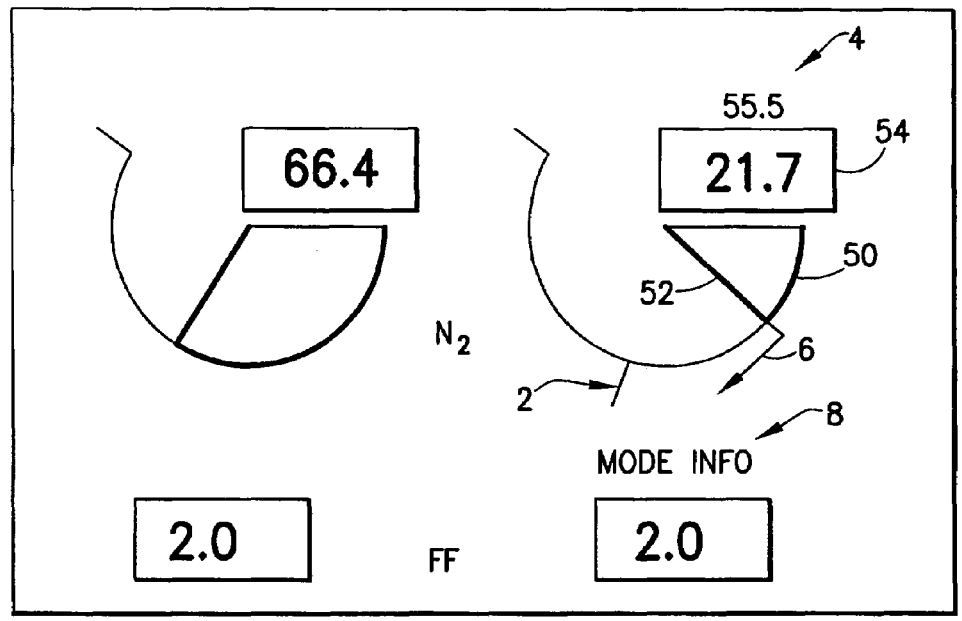
FIG. 4 is a drawing illustrating a display for presenting aircraft engine start/recovery information/indications in accordance with one embodiment of the invention.

FIG. 4 illustrates a display suitable for presentation on the display device 20 (see FIG. 3) in accordance with one embodiment of the invention. Numerals 2, 4, 6 and 8 in FIG. 4 refer to proposed engine start/recovery information/indications in accordance with this embodiment. These indications can and may be used alone or in combinations.

In the embodiment shown in FIG. 4, a tic mark 2 on a round dial scale 50 provides a graphical indication of the target idle running speed. This numeric value is located in the context of current and overall graphical indication of core engine speed. The current core speed is indicated by graphical indicator 52 in FIG. 4. In one implementation, the tic mark 2 is green in color. Note that different indication colors (e.g., white) may be used to ensure consistent contextual coding, to ensure salience, to correlate with other indications/annunciations, or for other purposes. Functionality is produced by use of sensed or inferred and calculated or predefined target idle running speed.

The display seen in FIG. 4 also has a numeric indication 4 that corresponds to the graphical indication 2 of the target idle running speed. This numeric value 4 is collocated above the numeric indication 54 of current core speed. Again, different indication colors (e.g., white) may be used to ensure consistent contextual coding, to ensure salience, to correlate with other indications/annunciations, or for other purposes. Also again, functionality is produced by use of sensed or inferred and calculated or predefined target idle running speed.

The display seen in FIG. 4 also has a dynamically increasing/decreasing white arrow 6 that is generally parallel to a tangent to the round dial scale 50 at the location where the current core speed graphical indicator 52 intersects the round dial scale. The direction of the arrow indicates whether the core speed is accelerating or decelerating. Arrow length is based on the magnitude of the core speed acceleration or deceleration and displays predicted core speed at some future time (e.g., 3, 5, 10, 15 or 30 seconds). Again different indication colors (e.g., green) may be used to ensure consistent contextual coding, to ensure salience, to correlate with other indications/annunciations, or for other purposes. Functionality is produced by use of sensed or inferred and calculated engine acceleration/deceleration utilized by a first-order filter and gain algorithm. In an alternative embodiment, the arrow may be curved and concentric with the round dial.

The arrow indicates predicted N2 in some predetermined interval (e.g., 10 seconds) based on engine acceleration or deceleration. In one possible implementation, a minimum fixed length arrow, approximately 5% N2 in length, is displayed for some minimum level of acceleration, e.g., somewhere between 0.05 to 5% N2/sec. The arrow is removed when acceleration decreases to zero or near zero. The arrow is displayed for deceleration greater than approximately 0.5% N2/sec. The arrow is removed when deceleration is <0.45% N2/sec. In this implementation, the display is biased to show very small levels of positive engine acceleration (recovery), and not display relatively small levels of deceleration. Such implementations are typically designed to promote correct pilot response, i.e., to prevent undesirable pilot intervention and allow the automation to attempt or complete recovery.

As is well known, each modern aircraft engine is controlled by an electronic engine control (EEC) system. Autostart is one function within the EEC that controls starting the engine. To start the engine, the crew typically selects a start switch to 'on' or 'start', waits for the engine to motor/spin/speed up to some minimum speed, then selects the a fuel control switch to 'on' or 'run' to allow fuel flow to the engine. There is typically a respective start switch and a respective fuel control switch for each engine. Placing the fuel control switch on typically enables the Autostart function.

The display panel disclosed herein may also include alphanumeric engine state and engine start/recovery automation mode information/indications. The alphanumeric information displayed may include current automation mode(s), countdown timers indicating estimated time to running, automation accommodation, or automation-induced delay. FIG. 4 shows a field 8 where mode information may be displayed. The color coded mode indications are intended to provide awareness of one or more of the following: (1) automation mode, e.g., AUTOSTART, AUTORELIGHT, MOTORING, IGNITION, etc. (in white (info) text); (2) engine start/recovery process or progress, e.g., 1:40 REMAINING, :30 DELAY, ABORTING, UNABLE RESTART, etc. (in white (info) text); and (3) engine state, e.g., SHUTDOWN (white), RUNNING (green), ENG FAIL (amber non-normal condition related text). This is not intended to be a complete list. Different indication colors (e.g., green, white, amber, red, etc) may be used to ensure consistent contextual coding, to ensure salience, to correlate with other indications/annunciations, or for other purposes. Functionality is produced by sensed or inferred engine and automation modes and states, and/or by use of sensed or inferred and calculated engine acceleration/deceleration utilized by a first-order filter and gain algorithm. In other embodiments, engine state and automation mode information/indication may be graphical and/or alphanumeric, and may be integrated with other engine parameters or implemented separately.

The indicator SHUTDOWN indicates that the engine has been manually shutdown. The throttle quadrant fuel control switches are in cutoff position (cutoff of fuel flow to engine) and engine automation is typically inhibited/disabled.

The indicator AUTOSTART (white text) indicates that the automation is in Autostart mode and working to start the engine, i.e., engine start automation is active and following programming to start/recover the engine, including motoring the engine between start attempts. The Autostart mode is typically initiated by selecting a control panel Autostart switch 'on', and selecting an engine start switch to 'on' or 'start', then selecting the fuel control switch to 'on' or 'run', or cycling the fuel control switch to 'off or ' cutoff and then 'on' or 'run'. The AUTOSTART indication is removed when the automation is no longer attempting engine start. AUTOSTART is displayed while the aircraft is on the ground during normal start and in flight if the engine fuel control switch is cycled from on/run to off/cutoff and back to on/run.

On ground, the engine start automation will typically make multiple start attempts. In flight, the engine start automation will typically continue to attempt restart until the crew manually commands engine shutdown.

The indicator AUTORELIGHT (white text) indicates that the engine has failed (gone sub-idle) and Autorelight automation is automatically attempting to recover the engine to idle running. This indicator is replaced by the Autostart mode indication if the engine fuel control switch is cycled from on/run to off/cutoff and back to on/run, thus typically enabling the Autostart automation. The Autorelight mode is typically initiated automatically when an engine flameout is detected in flight. The AUTORELIGHT indication is typically removed when the automation is no longer attempting engine relight/recovery, or when AUTOSTART is initiated.

The indicator MOTORING (white text) indicates that the fuel flow to the engine has been automatically or manually cutoff, and the engine starter is engaged/turning or 'motoring' the engine. Motoring typically occurs and is displayed on ground at the beginning of each start after motoring begins but before the fuel control is selected to run. Motoring also typically occurs after each automatic start attempt, but in the current embodiments is displayed only after the third Autostart attempt, or when manual motoring is commanded by the crew. Optionally, the MOTORING indicator could be displayed after each automatic start attempt, or whenever motoring is occurring.

The indicator RUNNING (green text) is temporarily displayed for some predetermined time (e.g., 10 seconds) after idle running speed is reached.

In the current embodiment, the proposed engine start/recovery indications appear only when an engine is sub-idle (below idle running speed). An engine goes sub-idle when the engine is shutdown (intentionally turned off), or has failed for some reason (e.g., damage, surge/stall, fuel exhaustion, etc). When the engine failure occurs at idle (e.g., during descent or approach), the indications help identify the condition and the affected engine. During normal start, or recovery/restart from failure, the indications aid the crew in determining if engine start/recovery is progressing and in estimating how long engine start/recovery will take. The indications clear once the engine is running (after starting or recovering from failure). In other embodiments, engine automation and state information/indication may be displayed at times when the current core speed of the aircraft engine is at or above its target idle running speed.

Figure 5:
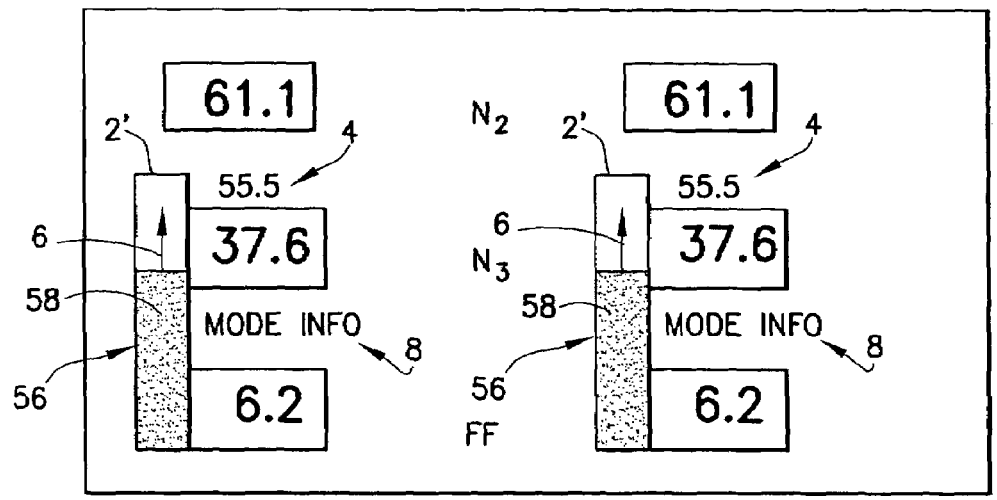
FIGS. 5-7 are drawings illustrating displays for presenting aircraft engine start/recovery information/indications in accordance with further embodiments of the invention.

FIG. 5 shows a portion of a display screen that displays engine start/recovery information/indications in accordance with an alternative embodiment of the invention. In this example, the number 55.5 again represents the target idle running speed, which is displayed directly above the current core speed 37.6. The arrow 6 again indicates the direction and magnitude of core speed acceleration/deceleration, thereby providing a visible prediction of future core speed. Instead of a round dial scale, a vertical bar scale 56 is used to graphically depict the current core speed and the target idle running speed. The filled area 58 below the arrow 6 indicates the current core speed. The horizontal line 2' at the top of the vertical bar scale 56 indicates the target idle running speed. Engine state and automation mode information can be displayed in field 8.

Figure 6:
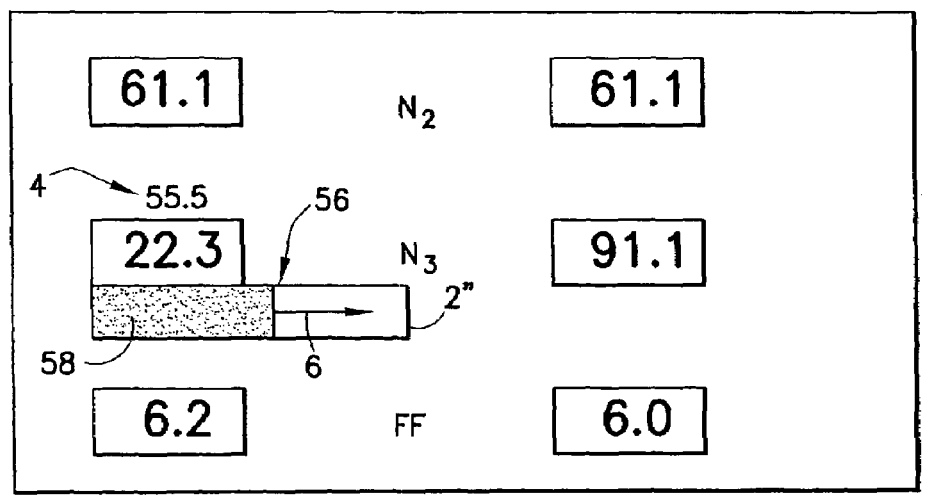

FIG. 6 shows a portion of a display screen that displays engine start/recovery information/indications in accordance with another alternative embodiment of the invention. In this example, the number 55.5 again represents the target idle running speed, which is displayed directly above the current core speed 22.3. The arrow 6 again indicates the direction and magnitude of core speed acceleration/deceleration, thereby providing a visible prediction of future core speed. Instead of a vertical bar scale, a horizontal bar scale 56' is used to graphically depict the current core speed and the target idle running speed. The filled area 58 to the left of the arrow 6 again indicates the current core speed. The vertical line 2" at the far right of the horizontal bar scale 56' indicates the target idle running speed. If desired, engine state and automation mode information (not shown in FIG. 6) can also be displayed on the screen.

Figure 7:
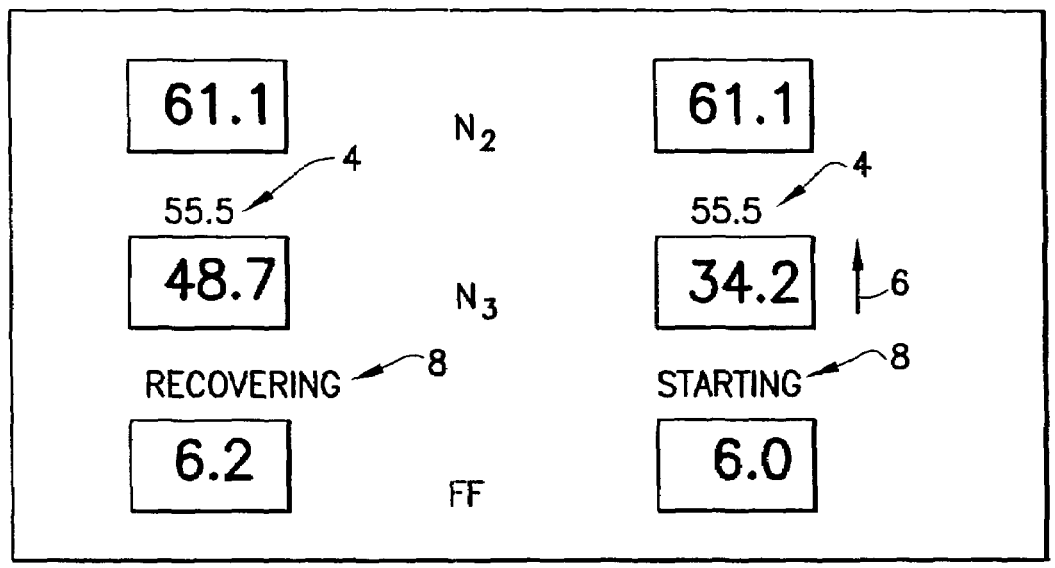

FIG. 7 shows a portion of a display screen that displays engine start/recovery information/indications in accordance with a further alternative embodiment of the invention. In this example, the number 55.5 again represents the target idle running speed, which is displayed directly above the current core speed (48.7 for one engine and 34.2 for the other engine). The arrow 6 indicates the direction (increasing or decreasing), but not magnitude of core speed acceleration/deceleration. In this example, the display screen does not include graphical indicators of current core speed and target idle running speed relative to a scale. Mode information is displayed on the screen for both engines in respective fields. In the example shown in FIG. 7, the status of one engine is RECOVERING while the status of the other engine is STARTING.

In accordance with the disclosed embodiments of the invention, the target idle running speed of an aircraft engine can be graphically and/or numerically displayed. Alternatively or additionally, predicted engine speed is displayed. Optionally, start/recovery engine state and automation mode information is also provided. The aforementioned information is designed to decrease crew monitoring, detection, and interpretation tasks/workload, and minimize the potential for inappropriate or undesirable crew intervention (automation interruption, engine shutdown, etc). Timely and proper crew action (or inaction) with respect to engine start, recovery and restart promotes safe and efficient airplane operations. The present invention has the potential to save airline time and money by; reducing airplane startup/ramp-related time (through increased crew awareness/predictability of engine state), reducing the potential for inadvertent/unnecessary engine shutdown (of a good/unaffected engine, or a slowly recovering engine), and reducing collateral impacts (unscheduled engine inspections/maintenance, negative impacts on extended-range twin-engine operations (ETOPS) operation/qualification, etc).

The invention improves system state and automation mode awareness, has potential for increased operational efficiency and in-flight shut down rate reduction. As disclosed above, the target idle running speed may be displayed when the current core speed of an operating aircraft is less than the target idle running speed. In addition or in the alternative, the target idle running speed may be displayed when the current core speed of an operating aircraft is decreasing abnormally towards the target idle running speed or for some other abnormal condition such as disagreement between the commanded and indicated thrust.

In the alternative or in addition to visual indicators, aural indicators (either tone or voice) may be given to the pilot by the system. Aural messages can be generated using either a tone generator or a voice simulator. For example, a voice message could be automatically generated that annunciates engine start/recovery information such as target idle running speed and current core speed, or the direction and magnitude of core speed acceleration/deceleration. Engine state and automation mode information can also be annunciated.

While the invention has been described with reference to certain embodiments, it will be understood by those skilled in the art that various changes may be made and equivalents may be substituted for members thereof without departing from the scope or spirit of the invention. In addition, many modifications may be made to adapt a particular situation to the teachings of the invention without departing from the essential scope or spirit thereof. Therefore it is intended that the invention not be limited to the particular embodiment disclosed as the best or preferred mode contemplated for carrying out this invention, but that the invention will include all embodiments falling within the scope of the appended claims.

In the absence of explicit language in any method claim setting forth the order in which certain steps should be performed, the method claims should not be construed to require that steps be performed in the order in which they are recited.

The invention claimed is:

1. A method for communicating aircraft engine information to a pilot, comprising the steps of generating indicators that indicate the current core speed of an operating aircraft engine, a target idle running speed different than said current core speed, and the predicted time duration to idle running, wherein said indicators are visual or aural.

2. The method as recited in claim 1, wherein said indicator that indicates said target idle running speed is generated when the current core speed is less than said target idle running speed.

3. The method as recited in claim 1, wherein said indicator that indicates said target idle running speed is generated when the current core speed is abnormally decreasing toward said target idle running speed.

4. The method as recited in claim 1, wherein said indicator that indicates said target idle running speed is generated when the current core speed of the aircraft engine is greater than said target idle running speed and certain abnormal conditions are present.

5. The method as recited in claim 1, further comprising the step of generating an indicator that indicates the direction in which the current core speed is changing, said indicator being biased to show very small levels of positive engine acceleration and not display relatively small levels of deceleration.

6. The method as recited in claim 1, further comprising the step of generating an indicator that indicates the predicted/estimated core speed at some predetermined future time.

7. The method as recited in claim 1, further comprising the step of generating an indicator that indicates the current engine state or automation mode for engine start, recovery, or operation.

8. The method as recited in claim 1, further comprising the step of displaying a scale for relating a symbol or symbols that indicate the current core speed of the aircraft engine to a symbol or symbols that indicate said target idle running speed.

9. The method as recited in claim 1, wherein the current core speed of the aircraft engine and said target idle running speed are indicated by respective numeric values.

10. A method for communicating aircraft engine information to a pilot, comprising the following steps:
    (a) calculating the current core speed and speed rate of change of an operating aircraft engine;
    (b) generating a first indicator that indicates said calculated current core speed while the aircraft engine is operating; and
    (c) generating second and third indicators at least whenever the operational state of the aircraft engine is a subidle condition, said second indicator indicating a target idle running speed of the aircraft engine different than said current core speed, and said third indicator indicating the predicted time duration to idle running,
    wherein said first through third indicators are visual or aural.

11. The method as recited in claim 10, wherein said first and second indicators are generated when the current core speed is less than said target idle running speed.

12. The method as recited in claim 10, wherein said first and second indicators are generated when the current core speed is abnormally decreasing toward said target idle running speed.

13. The method as recited in claim 10, wherein said first and second indicators are generated when the current core speed of the aircraft engine is greater than said target idle running speed and certain abnormal conditions are present.

14. The method as recited in claim 10, further comprising the step of displaying a reference scale, said first and second indicators being graphical indicators respectively located along said reference scale.

15. The method as recited in claim 14, wherein said reference scale has a first color and said second indicator has a second color different than said first color.

16. The method as recited in claim 14, wherein the color or graphical format of said second indicator changes when the current core speed is no longer less than said target idle running speed.

17. The method as recited in claim 10, wherein said first and second indicators are numeric.

18. The method as recited in claim 10, further comprising the step of generating a fourth indicator that indicates the direction in which the current core speed is changing, said fourth indicator being biased to show very small levels of positive engine acceleration and not display relatively small levels of deceleration.

19. The method as recited in claim 10, further comprising the step of generating a fourth indicator that indicates predicted/estimated core speed at some predetermined future time.

20. The method as recited in claim 10, further comprising the step of generating a third indicator that indicates current engine state or automation mode for engine start, recovery, or operation.

21. A system for indicating aircraft engine information onboard an aircraft, comprising:
    an indicator device that can be controlled electronically to generate indicators; and
    a processor programmed to control said indicator device to generate indicators indicating the current core speed of an operating aircraft engine, a target idle running speed different than said current core speed, and the predicted time duration to idle running in response to receipt of a signal indicating that a predetermined operating condition is present.

22. The system as recited in claim 21, wherein said predetermined operating condition is that the current core speed is less than said target idle running speed.

23. The system as recited in claim 21, wherein said predetermined operating condition is that the current core speed is abnormally decreasing towards said target idle running speed.

24. The system as recited in claim 21, wherein said predetermined operating condition is disagreement between the commanded and indicated thrust.

25. The system as recited in claim 21, wherein said processor is further programmed to control said indicator device to generate an indicator indicating the direction in which the current core speed is changing.

26. The system as recited in claim 21, wherein said processor is further programmed to control said indicator device to generate an indicator indicating the predicted/estimated core speed at some predetermined future time.

27. The system as recited in claim 21, wherein said processor is further programmed to control said indicator device to generate an indicator indicating the current engine state or automation mode for engine start, recovery, or operation.

* * * * *